E. B. SCHMUCKER.
FISH LINE HOLDER.
APPLICATION FILED NOV. 30, 1910.
1,016,783.
Patented Feb. 6, 1912.
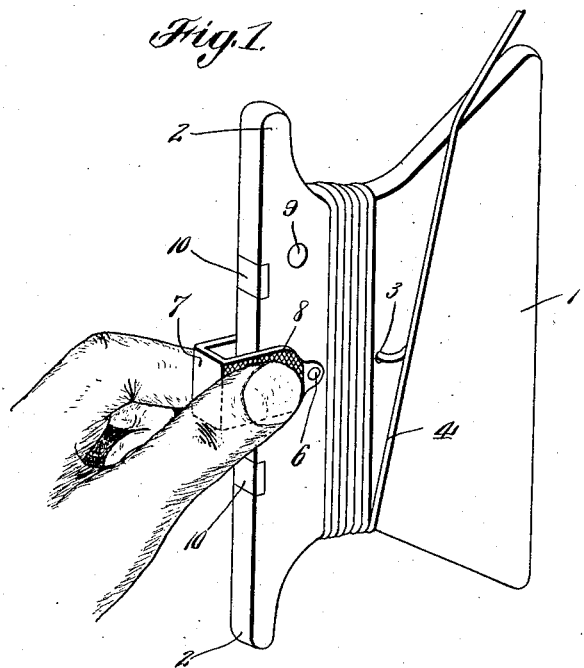
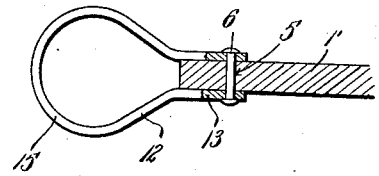
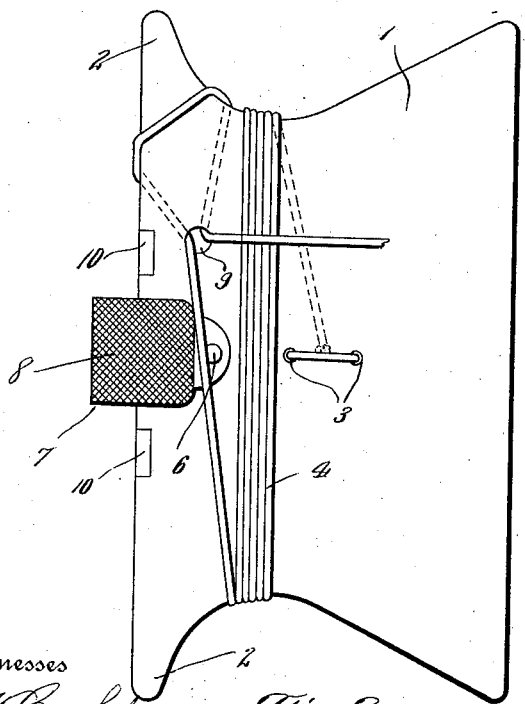
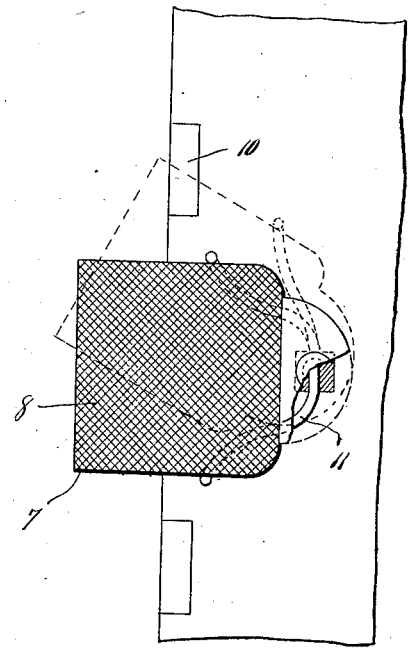
Witnesses
J. H. Crawford
Inventor
Edwin B. Schmucker,
By Victor J. Evans
Attorney
COLUMBIA PLANOGRAPH CO., WASHINGTON, D. C.

UNITED STATES PATENT OFFICE.

EDWIN B. SCHMUCKER, OF NORFOLK, VIRGINIA.

FISH-LINE HOLDER.

1,016,783. Specification of Letters Patent. Patented Feb. 6, 1912.

Application filed November 30, 1910. Serial No. 594,860.

*To all whom it may concern:*

Be it known that I, EDWIN B. SCHMUCKER, a citizen of the United States, residing at Norfolk, in the county of Norfolk and State of Virginia, have invented new and useful Improvements in Fish-Line Holders, of which the following is a specification.

This invention relates to improvements in holders for fishing lines and is directed for use in connection with that class of fishing tackle known as hand lines.

The primary object of the present invention is to provide a holding device for fishing lines which is extremely simple in construction, which can be manufactured at a low cost, and whereby the line may be readily unwound from the holder through the medium of a swinging movement of the said holder so that the necessity of rotating the hand around the holder as is now the common practice is entirely obviated.

With the above and other objects in view which will appear as the description progresses, the invention resides in the novel construction and arrangement of parts hereinafter fully described and claimed.

In the accompanying drawings, Figure 1 is a perspective view of a device constructed in accordance with the present invention and showing the manner in which the cord is unwound from the holder. Fig. 2 is a similar view illustrating the manner of retaining the cord upon the holder after a certain length of the said cord has been unwound. Fig. 3 is a detail view illustrating one manner of sustaining the finger clasp at right angles to the holder proper. Fig. 4 is a similar view of a modified form of the holder.

Ordinarily, holders for hand lines are constructed of a single piece of flattened rectangular material, preferably wood. The upper and lower transverse edges of the material are rounded from their longitudinal edges toward their centers to form what may be termed scalloped edges, the same being adapted to receive the strands of the cord. With this arrangement one end of the line is connected with the body of the holder in any desired manner, and when the end of the line provided with the sinker and hooks is to be unwound, the rectangular holder is retained in an immovable position by one hand of the operator while the other hand of the operator is employed to grasp the free end of the line and unwind the line from between the scalloped ends of the holder. This arrangement is not only tedious, but frequently results in the line becoming tangled. In other instances fishermen have been known to allow the holder containing the line to drop within the bottom of the boat and grasp the line and raise the same hand over hand until a sufficient amount of line has been removed from the holder. It is obvious that with this operation the holder is caused to bob up and down in the bottom of the boat and as fisher boats almost invariably contain a certain amount of water, the portion of the line not released from the holder becomes wet as well as the holder. As heretofore stated the holder is in most instances constructed of wood and it will be apparent that the life of the holder, after being subjected to moisture and contacting the bottom of the boat, is greatly shortened.

It is the purpose of the present invention to obviate the differences above enumerated and in the accompanying drawings, the numeral 1 designates a line holder constructed in accordance with the present invention. This line holder 1 may be formed of any suitable material, wood being preferred and the said holder is provided adjacent one of its longitudinal edges with oppositely disposed horns 2, the latter being formed by cutting away the transverse edges of the rectangular strip forming the body to provide parabolically curved edges. The horns 2 form comparatively straight surfaces while the remainder of the curved edges are inclined gracefully toward the opposite longitudinal edge of the holder 1.

The central portion of the holder is provided with a pair of spaced openings 3, whereby the end of the cord or line 4 is connected with the holder 1. The holder is centrally provided with an opening 5, the latter being positioned adjacent the longitudinal edge of the said holder provided with the horns 2. The opening 5 is adapted for the reception of a pintle 6, and this pintle is provided for the reception of a member 7 forming the finger hold of the device. The member 7 is of a cross sectional U-shaped formation in the devices illustrated in Figs. 1, 2 and 3 of the drawings, the said member having its opposite and outer side faces serrated or roughened as indicated by the numeral 8 and whereby the thumb and forefinger of one hand of the operator may firmly engage the said finger hold.

From the above description it will be readily noted that when the finger hold is grasped by the thumb and forefinger of the operator and the free end of the cord is grasped by the other hand of the operator the cord will easily glide from the inclined transverse edges of the member 1 causing the same to rock upon the pivot 6, the finger hold being retained in a stationary position. By this method it will be noted that the cord may easily and quickly unwind from the holder 1 without danger of tangling the line or injuring the holder.

The holder 1 is provided with a comparatively enlarged opening 9, the same being arranged preferably adjacent one of the horns 2, and this opening is adapted to serve as an eye through which a looped portion of the line may be fed, after the said line has been drawn from the holder a sufficient length to meet the depth of the water of the fishing grounds, and the said loop is passed or hooked over one of the horns 2, thus effectively sustaining the line against further unwinding.

In order to protect the side of the holder which contacts the U-shaped finger member when the line is being unwound from the said holder, I have provided the longitudinal edge thus contacted, with a pair of buffer members 10, the same being constructed preferably of rubber or some other suitable resilient material, and whereby one of the said buffers will, in a way, serve to assist in forcing the holder toward the opposite buffer.

In Fig. 3 I have illustrated the pintle for the holder surrounded by a helical spring 11, the same having its opposite convolutions bent in opposite directions and adapted to have their extremities offset and engage the opposite edges of the finger hold. By this arrangement the finger hold is sustained at a substantially right angle to the rectangular body 1 and it will be noted that when the body is caused to swing upon its pivot, when the line is unwound, the spring exerting pressure in opposite directions materially assists in the said unwinding of the line.

In Fig. 4 I have illustrated a slightly modified form of the finger hold. This finger hold, which is designated by the numeral 12, has its opposite arms 13 pivotally connected with the holder 1'. The member 12 is constructed of a single piece of suitable material and the arms 13 are spaced away from each other a distance approximately equaling the thickness of the holder 1'. The upper or connecting portion of the arms is of a substantially U-shape, so that a single finger of the operator may be positioned within the said ring 15 and the holder swung upon its pivot to unwind the cord in a manner similar to that heretofore set forth.

From the above description taken in connection with the accompanying drawings. the advantages of the device as well as the simplicity of the construction will be readily apparent to those skilled in the art to which the invention appertains, and while I have illustrated and described the preferred embodiment of the device as it now appears to me, changes in the minor details of construction within the scope of the appended claims may be resorted to if desired.

It is to be understood that while I have described and illustrated the device in connection with a fish line holder, the same may be employed with equal efficiency for sustaining ribbons, laces and the like, in which instance the holder may be constructed of cardboard or other inexpensive material.

Having thus fully described the invention, what I claim as new is:—

1. A line receiving holder comprising a flat substantially rectangular member, a pivoted holder for the member and said member adapted to oscillate upon its holder when the line is withdrawn from the holder.

2. A reel having a pivoted holder, a line for the holder, and the said holder being so positioned and pivoted upon the reel as to permit of oscillatory movement thereof when the line is being withdrawn from the holder.

3. A reel comprising a flattened member having its opposite edges scalloped to provide horns, a line upon the holder, a substantially U-shaped finger hold pivotally connected with the opposite faces of the holder, and said finger hold being so arranged as to permit of oscillatory movement of the reel when the line has unwound therefrom.

4. A holder having its opposite transverse edges incut to provide oppositely arranged horns, a line upon the reel, a finger-hold pivotally connected with the reel adjacent one side thereof, a spring member connected with the finger hold and adapted to normally sustain the said finger hold at a substantially right angle to the edge of the reel adjacent its pivotal connection therewith, and said finger hold adapted to permit of oscillatory movement of the reel when the line is unwound.

In testimony whereof I affix my signature in presence of two witnesses.

EDWIN B. SCHMUCKER.

Witnesses:
JOSEPH BILY, Jr.,
JOHN C. WILLIAMS.